United States Patent
Suyama et al.

(10) Patent No.: US 9,472,827 B2
(45) Date of Patent: Oct. 18, 2016

(54) SOLID ELECTROLYTE LAYER, ELECTRODE LAYER FOR SECONDARY BATTERY AND ALL SOLID SECONDARY BATTERY

(75) Inventors: Hiroshi Suyama, Mishima (JP); Shigenori Hama, Susono (JP); Satoshi Wakasugi, Owariasahi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 127 days.

(21) Appl. No.: 14/128,220

(22) PCT Filed: Jun. 29, 2011

(86) PCT No.: PCT/JP2011/064936
§ 371 (c)(1),
(2), (4) Date: Dec. 20, 2013

(87) PCT Pub. No.: WO2013/001623
PCT Pub. Date: Jan. 3, 2013

(65) Prior Publication Data
US 2014/0120427 A1    May 1, 2014

(51) Int. Cl.
*H01B 1/10* (2006.01)
*H01M 10/0562* (2010.01)
*H01M 10/052* (2010.01)

(52) U.S. Cl.
CPC ........... *H01M 10/0562* (2013.01); *H01B 1/10* (2013.01); *H01M 10/052* (2013.01); *H01M 2300/0068* (2013.01); *Y02E 60/122* (2013.01); *Y02T 10/7011* (2013.01)

(58) Field of Classification Search
CPC .. H01B 1/10; H01M 10/052; H01M 10/0562
USPC ......................................................... 429/306
See application file for complete search history.

(56) References Cited

U.S. PATENT DOCUMENTS

| | | | |
|---|---|---|---|
| 6,200,707 B1 | 3/2001 | Takada et al. | |
| 6,368,746 B1 | 4/2002 | Takada et al. | |
| 2011/0049745 A1 | 3/2011 | Katayama et al. | |
| 2011/0117431 A1 | 5/2011 | Fukui et al. | |

FOREIGN PATENT DOCUMENTS

| | | | |
|---|---|---|---|
| CN | 102005608 A | | 4/2011 |
| JP | A-06-060882 | | 3/1994 |
| JP | 2001316583 | * | 11/2001 |
| JP | 2001-351633 A | | 12/2001 |
| JP | B2-3655443 | | 6/2005 |
| JP | 2010-199033 A | | 9/2010 |
| JP | 2010-282948 A | | 12/2010 |
| JP | 2011-014387 A | | 1/2011 |
| JP | 2011-044249 A | | 3/2011 |
| JP | 2011-048921 A | | 3/2011 |
| JP | A-2011-134675 | | 7/2011 |
| JP | 2011-233422 A | | 11/2011 |

\* cited by examiner

*Primary Examiner* — Edward Cain
(74) *Attorney, Agent, or Firm* — Oliff PLC

(57) ABSTRACT

A main object of the present invention is to provide a solid electrolyte layer having flexibility, in which ion conductivity is inhibited from decreasing. The present invention attains the above-mentioned object by providing a solid electrolyte layer including a sulfide solid electrolyte material not having cross-linking sulfur substantially and a branched polymer for binding the above-mentioned sulfide solid electrolyte material.

6 Claims, 2 Drawing Sheets

SOLID ELECTROLYTE LAYER, ELECTRODE LAYER FOR SECONDARY BATTERY AND ALL SOLID SECONDARY BATTERY

TECHNICAL FIELD

The present invention relates to a solid electrolyte layer having flexibility, in which ion conductivity is inhibited from decreasing.

BACKGROUND ART

Among various batteries, a lithium battery having the advantages of light weight, high output and high energy density is frequently used as a power source of small-sized portable electronic equipment and portable information terminals, and supports the present information-oriented society. Also, a lithium battery has drawn attention as a power source of an electric automobile or a hybrid car, and further higher energy density, an improvement in safety, and upsizing are demanded therefrom.

Liquid electrolyte containing a flammable organic solvent is used for a presently commercialized lithium battery, so that the installation of a safety device for restraining temperature rise during a short circuit and the improvement in structure and material for preventing the short circuit are necessary therefor. On the contrary, a lithium battery all-solidified by replacing the liquid electrolyte with a solid electrolyte layer is conceived to intend the simplification of the safety device and be excellent in production cost and productivity for the reason that the flammable organic solvent is not used in the battery.

In the field of such an all solid lithium battery, it is known that the use of a sulfide solid electrolyte material for a solid electrolyte layer and an electrode layer improves Li ion conductivity of an all solid lithium battery.

On the other hand, the addition of a polymer as a binder to a solid electrolyte layer and an electrode layer is attempted. The addition of a polymer allows flexibility to the layers, and allows workability and moldability to be improved. For example, in Patent Literature 1, a solid electrolyte layer and an electrode layer, in which hydrogenated butadiene rubber (HBR) is used as a binder and $0.5Li_2S$-$0.5P_2S_5$ is used as a sulfide solid electrolyte material, are disclosed. Also, in Patent Literature 2, a binder for a hydrogen absorbing alloy electrode containing a hydrogenated block copolymer is disclosed.

CITATION LISTS

Patent Literatures

Patent Literature 1: Japanese Patent No. 3655443
Patent Literature 2: Japanese Patent Application Publication (JP-A) No. H06-060882

SUMMARY OF INVENTION

Technical Problem

It has been conventionally known that ion conductivity of a solid electrolyte layer or an electrode layer decreases for the reason that a binder ordinarily has no ion conductivity although the addition of a binder allows flexibility to a solid electrolyte layer or an electrode layer, and the maintenance of compatibility between flexibility and ion conductivity is demanded.

The present invention has been made in view of the above-mentioned actual circumstances, and the main object thereof is to provide a solid electrolyte layer having flexibility, in which ion conductivity is inhibited from decreasing.

Solution to Problem

In order to solve the above-mentioned problems, the present invention provides a solid electrolyte layer comprising a sulfide solid electrolyte material not having cross-linking sulfur substantially and a branched polymer for binding the above-mentioned sulfide solid electrolyte material.

According to the present invention, the use of the sulfide solid electrolyte material not having cross-linking sulfur substantially and the branched polymer allows the solid electrolyte layer having flexibility, in which ion conductivity (such as Li ion conductivity) is inhibited from decreasing.

In the above-mentioned invention, the above-mentioned branched polymer is preferably a hydrogenated polymer. The reason therefor is to allow resistance increase of the solid electrolyte layer to be inhibited.

In the above-mentioned invention, the above-mentioned sulfide solid electrolyte material is preferably an $Li_2S$—$P_2S_5$ material. The reason therefor is to allow the sulfide solid electrolyte material excellent in Li ion conductivity.

In the above-mentioned invention, the ratio of $Li_2S$ and $P_2S_5$ in the above-mentioned $Li_2S$—$P_2S_5$ material is preferably within a range of $Li_2S:P_2S_5$=72:28 to 78:22 in terms of mol. The reason therefor is to allow the sulfide solid electrolyte material with less cross-linking sulfur.

Also, the present invention provides an electrode layer for a secondary battery comprising an active material, a sulfide solid electrolyte material not having cross-linking sulfur substantially, and a branched polymer for binding the above-mentioned active material and the above-mentioned sulfide solid electrolyte material.

According to the present invention, the use of the sulfide solid electrolyte material not having cross-linking sulfur substantially and the branched polymer allows the electrode layer for a secondary battery having flexibility, in which ion conductivity (such as Li ion conductivity) is inhibited from decreasing.

In the above-mentioned invention, the above-mentioned branched polymer is preferably a hydrogenated polymer. The reason therefor is to allow resistance increase and capacity decrease of the electrode layer for a secondary battery to be inhibited.

In the above-mentioned invention, the above-mentioned sulfide solid electrolyte material is preferably an $Li_2S$—$P_2S_5$ material. The reason therefor is to allow the sulfide solid electrolyte material excellent in Li ion conductivity.

In the above-mentioned invention, the ratio of $Li_2S$ and $P_2S_5$ in the above-mentioned $Li_2S$—$P_2S_5$ material is preferably within a range of $Li_2S:P_2S_5$=72:28 to 78:22 in terms of mol. The reason therefor is to allow the sulfide solid electrolyte material with less cross-linking sulfur.

Also, the present invention provides an all solid secondary battery comprising a cathode layer containing a cathode active material, an anode layer containing an anode active material, and a solid electrolyte layer formed between the above-mentioned cathode layer and the above-mentioned anode layer, wherein the above-mentioned solid electrolyte layer is the solid electrolyte layer described above.

According to the present invention, the use of the solid electrolyte layer described above allows the all solid secondary battery with low battery resistance.

Also, the present invention provides an all solid secondary battery comprising a cathode layer containing a cathode active material, an anode layer containing an anode active material, and a solid electrolyte layer formed between the above-mentioned cathode layer and the above-mentioned anode layer, wherein at least one of the above-mentioned cathode layer and the above-mentioned anode layer is the electrode layer for a secondary battery described above.

According to the present invention, the use of the electrode layer for a secondary battery described above allows the all solid secondary battery with low battery resistance. Also, the use may inhibit a high resistive layer from being produced by a reaction between an active material and a sulfide solid electrolyte material, and allows the all solid secondary battery with low battery resistance.

Advantageous Effects of Invention

The present invention produces the effect such as to allow a solid electrolyte layer having flexibility, in which ion conductivity is inhibited from decreasing.

DESCRIPTION OF EMBODIMENTS

A solid electrolyte layer, an electrode layer for a secondary battery and an all solid secondary battery of the present invention are hereinafter described in detail.

A. Solid Electrolyte Layer

First, a solid electrolyte layer of the present invention is described. The solid electrolyte layer of the present invention comprises a sulfide solid electrolyte material not having cross-linking sulfur substantially and a branched polymer for binding the above-mentioned sulfide solid electrolyte material.

According to the present invention, the use of the sulfide solid electrolyte material not having cross-linking sulfur substantially and the branched polymer allows the solid electrolyte layer having flexibility, in which ion conductivity (such as Li ion conductivity) is inhibited from decreasing. It is conceived that the branched polymer may be bound to the sulfide solid electrolyte material in plural spots in being added to the solid electrolyte layer. Thus, the addition by a small amount allows flexibility and high binding capacity, and allows ion conductivity to be inhibited from decreasing.

The sulfide solid electrolyte material not having cross-linking sulfur substantially is used in the present invention. Cross-linking sulfur (such as the cross-linking sulfur of an $S_3P$—$S$—$PS_3$ unit) is so high in reactivity as to cause the deterioration of a sulfide solid electrolyte material by reacting with a binder. On the contrary, the sulfide solid electrolyte material in the present invention does not have cross-linking sulfur substantially, so as to deteriorate with difficulty and allow ion conductivity of the solid electrolyte layer to be inhibited from decreasing.

Figure 1:
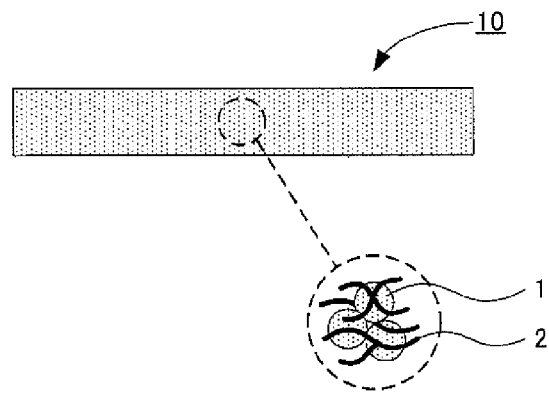
FIG. 1 is a schematic cross-sectional view showing an example of a solid electrolyte layer of the present invention.

FIG. 1 is a schematic cross-sectional view showing an example of the solid electrolyte layer of the present invention. A solid electrolyte layer 10 shown in FIG. 1 comprises a sulfide solid electrolyte material 1 not having cross-linking sulfur substantially and a branched polymer 2 for binding the sulfide solid electrolyte material 1.

The solid electrolyte layer of the present invention is hereinafter described in each constitution.

1. Sulfide Solid Electrolyte Material

Next, the sulfide solid electrolyte material in the present invention is described. The sulfide solid electrolyte material in the present invention does not have cross-linking sulfur substantially. Here, "cross-linking sulfur" signifies the sulfur element of an —S— bond produced during the synthesis of the sulfide solid electrolyte material. "Not having cross-linking sulfur substantially" signifies that the ratio of cross-linking sulfur contained in the sulfide solid electrolyte material is so small as not to deteriorate the sulfide solid electrolyte material by a reaction with the branched polymer. In this case, the ratio of cross-linking sulfur is, for example, preferably 10 mol % or less, more preferably 5 mol % or less.

Also, "not having cross-linking sulfur substantially" may be confirmed by Raman spectroscopy. For example, in the case where the sulfide solid electrolyte material in the present invention is an $Li_2S$—$P_2S_5$ material, a peak of an $S_3P$—$S$—$PS_3$ unit (a $P_2S_7$ unit) having cross-linking sulfur may be produced. This peak ordinarily appears at 402 cm$^{-1}$. Thus, in the present invention, it is preferable that this peak is not detected. Also, a peak of a $PS_4$ unit ordinarily appears at 417 cm$^{-1}$. In the present invention, the intensity $I_{402}$ cm$^{-1}$ is preferably smaller than the intensity $I_{417}$ at 417 cm$^{-1}$. More specifically, the intensity $I_{402}$ is, for example, preferably 70% or less, more preferably 50% or less, and far more preferably 35% or less with respect to the intensity $I_{417}$. Also, with regard to a sulfide solid electrolyte material except the $Li_2S$—$P_2S_5$ material, "not having cross-linking sulfur substantially" may be determined by specifying a unit having cross-linking sulfur to measure a peak of the unit. Incidentally, "not having cross-linking sulfur substantially" may be confirmed also by using a result of measuring raw material composition ratio and NMR in synthesizing the sulfide solid electrolyte material besides a result of measuring Raman spectroscopy.

The sulfide solid electrolyte material in the present invention is not particularly limited if the material is such as not to have cross-linking sulfur substantially. Here, in the case where the solid electrolyte layer of the present invention is used for an all solid lithium battery, examples of the above-mentioned sulfide solid electrolyte material include a sulfide solid electrolyte material obtained by using a raw material composition containing $Li_2S$ and a sulfide of an element of the thirteenth family to the fifteenth family. Examples of the above-mentioned element of the thirteenth family to fifteenth family include B, Al, Si, Ge, P, As and Sb, and specific examples of the above-mentioned sulfide of the element of the thirteenth family to the fifteenth family include $B_2S_3$, $Al_2S_3$, $SiS_2$, $GeS_2$, $P_2S_3$, $P_2S_5$, $As_2S_3$ and $Sb_2S_3$. Above all, in the present invention, the sulfide solid electrolyte material obtained by using a raw material composition containing $Li_2S$ and a sulfide of an element of the thirteenth family to the fifteenth family is preferably an $Li_2S$—$P_2S_5$ material, an $Li_2S$—$SiS_2$ material, an $Li_2S$—$GeS_2$ material, an $Li_2S$—$Al_2S_3$ material or an $Li_2S$—$B_2S_3$ material, more preferably an $Li_2S$—$P_2S_5$ material. The reason therefor is to be excellent in Li ion conductivity. Incidentally, the $Li_2S$—$P_2S_5$ material is the sulfide solid electrolyte material obtained by using a raw material composition containing $Li_2S$ and $P_2S_5$, and may be such as to contain $Li_2S$ and $P_2S_5$ as the main raw material, or such as to further contain another material. Other descriptions are also the same.

$Li_2S$ contained in the above-mentioned raw material composition preferably has fewer impurities. The reason therefor is to allow a side reaction to be inhibited. Examples of a synthesis method for $Li_2S$ include a method described in JP-A No. H07-330312. In addition, $Li_2S$ is preferably purified by using a method described in WO 2005/040039. Also, a raw material composition may contain lithium ortho-oxoate of at least one kind selected from the group consisting of $Li_3PO_4$, $Li_4SiO_4$, $Li_4GeO_4$, $Li_3BO_3$ and $Li_3AlO_3$ in addition to $Li_2S$ and sulfide of an element of the thirteenth family to the fifteenth family. The addition of such lithium ortho-oxoate allows the more stable sulfide solid electrolyte material.

Also, in the case where the sulfide solid electrolyte material in the present invention is obtained by using a raw material composition containing $Li_2S$, it is preferable that the above-mentioned sulfide solid electrolyte material does not have $Li_2S$ substantially. "Not having $Li_2S$ substantially" signifies "not containing $Li_2S$ derived from a starting material substantially". It is preferable that $Li_2S$ is not contained by reason of being high in reactivity similarly to cross-linking sulfur. "Not having $Li_2S$ substantially" may be confirmed by X-ray diffraction. Specifically, in the case of not having a peak of $Li_2S$ ($2\theta=27.0°$, $31.2°$, $44.8°$ and $53.1°$), "not containing $Li_2S$ substantially" may be determined. Incidentally, too large ratio of $Li_2S$ in a raw material composition brings a tendency for the sulfide solid electrolyte material to contain $Li_2S$; on the contrary, too small ratio of $Li_2S$ in a raw material composition brings a tendency for the sulfide solid electrolyte material to contain the above-mentioned cross-linking sulfur.

In the case where the sulfide solid electrolyte material in the present invention does not have cross-linking sulfur and $Li_2S$ substantially, the sulfide solid electrolyte material ordinarily has an ortho-composition or a composition in the neighborhood thereof. Here, ortho generally signifies oxo acid which is the highest in degree of hydration among oxo acids obtained by hydrating the same oxide. In the present invention, a crystal composition to which $Li_2S$ is added most among sulfides is called an ortho-composition. For example, $Li_3PS_4$ corresponds to an ortho-composition in the $Li_2S$—$P_2S_5$ system, $Li_4SiS_4$ corresponds to an ortho-composition in the $Li_2S$—$SiS_2$ system, $Li_4GeS_4$ corresponds to an ortho-composition in the $Li_2S$—$GeS_2$ system, $Li_3AlS_3$ corresponds to an ortho-composition in the $Li_2S$—$Al_2S_3$ system, and $Li_3BS_3$ corresponds to an ortho-composition in the $Li_2S$—$B_2S_3$ system.

Also, in the case of an $Li_2S$—$P_2S_5$-based sulfide solid electrolyte material, the ratio of $Li_2S$ and $P_2S_5$ such as to allow an ortho-composition is $Li_2S:P_2S_5=75:25$ on a molar basis. The case of an $Li_2S$—$Al_2S_3$-based sulfide solid electrolyte material and the case of an $Li_2S$—$B_2S_3$-based sulfide solid electrolyte material are also similar thereto. On the other hand, in the case of an $Li_2S$—$SiS_2$-based sulfide solid electrolyte material, the ratio of $Li_2S$ and $SiS_2$ such as to allow an ortho-composition is $Li_2S:SiS_2=66.7:33.3$ on a molar basis. The case of an $Li_2S$—$GeS_2$-based sulfide solid electrolyte material is also similar thereto.

In the case where the sulfide solid electrolyte material in the present invention is an $Li_2S$—$P_2S_5$ material, the ratio of $Li_2S$ and $P_2S_5$ is preferably within a range of $Li_2S:P_2S_5=72:28$ to $78:22$, more preferably within a range of $Li_2S:P_2S_5=73:27$ to $77:23$, and far more preferably within a range of $Li_2S:P_2S_5=74:26$ to $76:24$ in terms of mol. The reason therefor is that reactivity with the branched polymer may be further decreased by determining the ratio of both in a range including the ratio such as to allow an ortho-composition ($Li_2S:P_2S_5=75:25$) and the neighborhood thereof. Incidentally, the case where the above-mentioned sulfide solid electrolyte material is an $Li_2S$—$Al_2S_3$ material and the case where the above-mentioned sulfide solid electrolyte material is an $Li_2S$—$B_2S_3$ material are also similar thereto. On the other hand, in the case where the above-mentioned sulfide solid electrolyte material is an $Li_2S$—$SiS_2$ material, the ratio of $Li_2S$ and $SiS_2$ is preferably within a range of $Li_2S:SiS_2=63:37$ to $70:30$, more preferably within a range of $Li_2S:SiS_2=64:36$ to $69:31$, and far more preferably within a range of $Li_2S:SiS_2=65:35$ to $68:32$ on a molar basis. The reason therefor is that reactivity with the branched polymer may be further decreased by determining the ratio of both in a range including the ratio such as to allow an ortho-composition ($Li_2S:SiS_2=66.7:33.3$) and the neighborhood thereof. Incidentally, the case where the above-mentioned sulfide solid electrolyte material is an $Li_2S$—$GeS_2$ material is also similar thereto.

The sulfide solid electrolyte material in the present invention may be sulfide glass or crystallized sulfide glass obtained by heat-treating the sulfide glass. Sulfide glass may be obtained by performing an amorphization method for the above-mentioned raw material composition, for example. Examples of the amorphization method include a mechanical milling method and a melt extraction method, and a mechanical milling method is preferable among them. The reason therefor is that treatment at normal temperature may be performed to intend the simplification of production processes. The mechanical milling is not particularly limited if it is a method for mixing a raw material composition while allowing mechanical energy thereto; examples thereof include ball mill, turbo mill, mechano-fusion and disk mill, and ball mill is preferable among them and planetary ball mill is particularly preferable. The reason therefor is to efficiently allow a desired sulfide solid electrolyte material. Also, the conditions of the mechanical milling are preferably determined so as to allow a desired sulfide solid electrolyte material. On the other hand, crystallized sulfide glass may be obtained by heat-treating sulfide glass at a temperature of crystallization temperature or more, for example. That is to say, crystallized sulfide glass may be obtained by performing the amorphization method for a raw material composition, which is further heat-treated. Incidentally, depending on the conditions of heat treatment, there is a possibility of producing cross-linking sulfur and $Li_2S$ and a possibility of producing a stable phase, so that heat treatment temperature and heat treatment time are preferably adjusted so as not to produce these in the present invention.

Examples of the shape of the sulfide solid electrolyte material in the present invention include a particulate shape, preferably a perfectly spherical shape or an elliptically spherical shape, above all. Also, in the case where the sulfide solid electrolyte material is in a particulate shape, the average particle diameter thereof ($D_{50}$) is, for example, preferably within a range of 0.1 μm to 50 μm. Incidentally, the above-mentioned average particle diameter may be determined by a granulometer, for example. Also, in the case where the sulfide solid electrolyte material in the present invention is an Li ion conductor, Li ion conductivity at normal temperature is, for example, preferably $1\times10^{-5}$ S/cm or more, and more preferably $1\times10^{-4}$ S/cm or more.

The content of the sulfide solid electrolyte material in the solid electrolyte layer is preferably large. Specifically, the content is preferably 50% by mass or more, more preferably 70% by mass or more, far more preferably 90% by mass or more, and particularly preferably 95% by mass or more.

2. Branched Polymer

Next, a branched polymer in the present invention is described. The branched polymer in the present invention binds the above-mentioned sulfide solid electrolyte material. Here, 'branched' signifies a structure such that a straight-chain polymer extends from a carbon atom as the center in three directions or four directions, and "straight-chain" signifies a structure such that carbon atoms forming the main chain of the polymer bond into a chain without making a branched structure. It is conceived that the branched polymer is bound to the sulfide solid electrolyte material in plural spots in being added as a binder to the solid electrolyte layer, so that the addition by a small amount allows flexibility and high binding capacity, and consequently allows ion conductivity (such as Li ion conductivity) to be inhibited from decreasing.

In the present invention, the carbon number of the main chain of each straight-chain polymer contained in the branched polymer is, for example, preferably 10 or more, above all, more preferably 100 or more, additionally, particularly preferably 1,000 or more. On the other hand, the carbon number of the main chain of each straight-chain polymer contained in the branched polymer is preferably at least 20,000 or less.

Figure 2A:
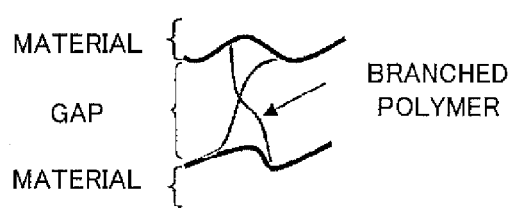
FIGS. 2A and 2B are each a schematic view explaining material binding of a branched polymer and an unbranched polymer.
Figure 2B:
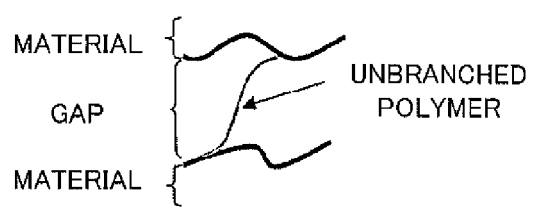

FIGS. 2A and 2B are each a schematic view explaining material binding by a branched polymer and an unbranched polymer. As shown in FIG. 2A, the branched polymer has so many contact points with a material that binding capacity increases; whereas, as shown in FIG. 2B, the unbranched polymer has so few contact points with a material that binding capacity decreases. In the present invention, the use of the branched polymer as a binder allows a desired flexibility to be achieved by a small amount of the binder, and the binder is so small in amount as to allow high ion conductivity to be maintained.

The branched polymer in the present invention is preferably an elastomer. The reason therefor is to be excellent in binding property. Also, the above-mentioned elastomer may be a thermosetting elastomer or a thermoplastic elastomer, preferably a thermosetting elastomer, and more preferably rubber. Also, rubber may be vulcanized or not vulcanized.

Also, the branched polymer in the present invention is preferably a hydrocarbon polymer. The hydrocarbon polymer may be such as to comprise carbon and hydrogen, or such as to substitute part or all of hydrogen bonding to carbon with a halogen such as fluorine.

Also, in the present invention, the above-mentioned hydrocarbon polymer may be a diene polymer having a double bond in the main chain, or a nondiene polymer not having a double bond in the main chain, preferably the latter among them. The reason therefor is that the nondiene polymer does not have a double bond in the main chain, and thereby is so low in reactivity as to allow the sulfide solid electrolyte material to be inhibited from deteriorating and allow battery resistance to be inhibited from increasing. Examples of the nondiene polymer include an olefin polymer such as ethylene propylene rubber (EPM) and a fluorine polymer such as polyvinylidene fluoride (PVdF).

On the other hand, examples of the diene polymer include styrene butadiene rubber (SBR), butadiene rubber (BR), isoprene rubber (IR) and chloroprene rubber (CR).

Also, in the present invention, the branched polymer is preferably a hydrogenated polymer. The reason therefor is to allow resistance increase of the solid electrolyte layer to be inhibited. The unsaturated bond of the branched polymer decreases due to the hydrogenation, so that reactivity between the branched polymer and non-cross-linking sulfur contained in the sulfide solid electrolyte material and cross-linking sulfur existing slightly therein becomes so low as to allow the sulfide solid electrolyte material to be inhibited from deteriorating and allow the solid electrolyte layer with resistance increase inhibited.

Incidentally, in an electrode layer for a secondary battery described in the after-mentioned "B. Electrode layer for secondary battery", resistance increase and capacity decrease of the electrode layer for a secondary battery may be inhibited for the reason that the branched polymer is a hydrogenated polymer. The number of the unsaturated bonds of the branched polymer decreases due to the hydrogenation, so that the branched polymer easily exhibits elastic deformation and easily absorbs expansion and contraction of an active material during charge and discharge. Thus, electrode materials such as the active material and the sulfide solid electrolyte material may be inhibited from peeling off the electrode layer for a secondary battery to allow the electrode layer for a secondary battery with capacity decrease inhibited. Resistance increase is the same as the case of the above-mentioned solid electrolyte layer.

Examples of the hydrogenated polymer include hydrogenated styrene butadiene rubber (HSBR), hydrogenated butadiene rubber (HBR) and hydrogenated isoprene rubber (HIR), and preferably HSBR and HBR above all. The reason therefor is to allow high flexibility to the solid electrolyte layer.

The hydrogenation rate of the hydrogenated polymer is, for example, preferably 90% or more, and more preferably 95% or more. The reason therefor is that too low hydrogenation rate of the hydrogenated polymer brings a possibility that the effect of the above-mentioned hydrogenation may not sufficiently be performed for the reason that the unsaturated bond in the branched polymer is not removed so much.

The number-average molecular weight of the branched polymer is, for example, preferably within a range of 1,000 to 700,000, more preferably within a range of 10,000 to 500,000, and far more preferably within a range of 150,000 to 300,000. The reason therefor is that too small molecular weight of the branched polymer brings a possibility of not allowing a desired flexibility, whereas too large molecular weight of the branched polymer brings a possibility that solubility in a solvent decreases and a desired dispersion state is not obtained. Incidentally, the number-average molecular weight of the branched polymer may be measured by gel permeation chromatography (GPC), for example.

The content of the branched polymer in the solid electrolyte layer varies with kinds of the branched polymer, and is, for example, preferably within a range of 0.01% by mass to 30% by mass, and more preferably within a range of 0.1% by mass to 10% by mass. The reason therefor is that too small content of the branched polymer brings a possibility of not allowing a desired flexibility, whereas too large content of the branched polymer brings a possibility of decreasing ion conductivity.

3. Solid Electrolyte Layer

The solid electrolyte layer of the present invention preferably has a desired flexibility. The reason therefor is to be excellent in workability and moldability. Examples of the shape of the solid electrolyte layer include a sheet shape and a pellet shape. The thickness of the solid electrolyte layer is not particularly limited but is, for example, preferably within a range of 0.1 µm to 1000 µm, and more preferably within a range of 0.1 µm to 300 µm.

A method for producing the solid electrolyte layer of the present invention is not particularly limited if the method is such as to allow the above-mentioned solid electrolyte layer to be formed, but examples thereof include a method such that the sulfide solid electrolyte material and the branched polymer are mixed in a solvent to produce slurry, which is coated on a substrate by using coating methods such as a doctor blade method, a die coating method and a gravure coating method to thereafter dry the solvent. The above-mentioned solvent is not particularly limited if the solvent may disperse the sulfide solid electrolyte material and the branched polymer, but a nonpolar solvent is preferably used for the reason that the sulfide solid electrolyte material reacts with a polar solvent. Examples of the nonpolar solvent include saturated hydrocarbon solvent, aromatic hydrocarbon solvent, fluorine solvent and chlorine solvent.

B. Electrode Layer for Secondary Battery

Next, an electrode layer for a secondary battery of the present invention is described. The electrode layer for a secondary battery of the present invention comprises an active material, a sulfide solid electrolyte material not having cross-linking sulfur substantially, and a branched polymer for binding the above-mentioned active material and the above-mentioned sulfide solid electrolyte material.

According to the present invention, the use of the sulfide solid electrolyte material not having cross-linking sulfur substantially and the branched polymer allows the electrode layer for a secondary battery having flexibility, in which ion conductivity (such as Li ion conductivity) is inhibited from decreasing. Incidentally, the advantage of the sulfide solid electrolyte material and the branched polymer in the present invention is the same as the contents described in the above-mentioned "A. Solid electrolyte layer". In addition, the active material contained in the electrode layer for a secondary battery reacts with a sulfide solid electrolyte material having cross-linking sulfur to produce a high resistive layer. On the contrary, in the present invention, the use of the sulfide solid electrolyte material not having cross-linking sulfur substantially allows the production of a high resistive layer to be inhibited. As a result, the electrode layer for a secondary battery with lower resistance may be obtained.

Figure 3:
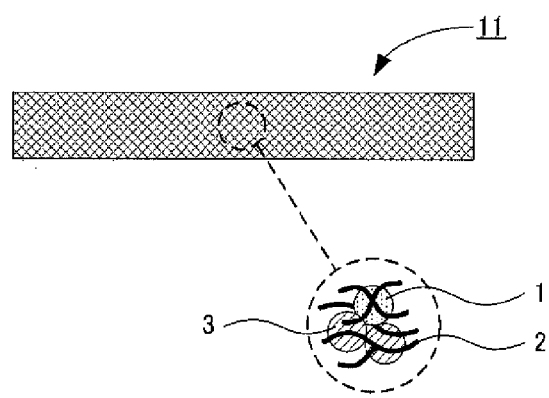
FIG. 3 is a schematic cross-sectional view showing an example of an electrode layer for a secondary battery of the present invention.

FIG. 3 is a schematic cross-sectional view showing an example of the electrode layer for a secondary battery of the present invention. An electrode layer for a secondary battery 11 shown in FIG. 3 comprises an active material 3, a sulfide solid electrolyte material 1 not having cross-linking sulfur substantially, and a branched polymer 2 for binding the active material 3 and the sulfide solid electrolyte material 1.

The electrode layer for a secondary battery of the present invention comprises at least the active material, the sulfide solid electrolyte material, and the branched polymer. Incidentally, the sulfide solid electrolyte material and the branched polymer are the same as the contents described in the above-mentioned "A. Solid electrolyte layer"; therefore, the description herein is omitted.

The active material in the present invention may be a cathode active material or an anode active material, above all, preferably a cathode active material, particularly, preferably an oxide cathode active material. The reason therefor is that the oxide cathode active material reacts with a sulfide solid electrolyte material having cross-linking sulfur to easily produce a high resistive layer. In the present invention, the use of the sulfide solid electrolyte material not having cross-linking sulfur substantially allows the production of a high resistive layer to be inhibited. Also, the use of the oxide cathode active material allows the electrode layer for a secondary battery with high energy density. Examples of the oxide cathode active material used for an all solid lithium battery include an oxide cathode active material represented by a general formula $Li_xM_yO_z$ (M is a transition metallic element, x=0.02 to 2.2, y=1 to 2 and z=1.4 to 4). In the above-mentioned general formula, M is preferably at least one kind selected from the group consisting of Co, Mn, Ni, V and Fe, and more preferably at least one kind selected from the group consisting of Co, Ni and Mn. Specific examples of such an oxide cathode active material include rock salt bed type cathode active materials such as $LiCoO_2$, $LiMnO_2$, $LiNiO_2$, $LiVO_2$ and $LiNi_{1/3}Co_{1/3}Mn_{1/3}O_2$, and spinel type cathode active materials such as $LiMn_2O_4$ and $Li(Ni_{0.5}Mn_{1.5})O_4$. Also, examples of the oxide cathode active material other than the above-mentioned general formula of $Li_xM_yO_z$ include olivine type cathode active materials such as $LiFePO_4$, $LiMnPO_4$ and $LiCoPO_4$, and Si-containing cathode active materials such as $Li_2FeSiO_4$ and $Li_2MnSiO_4$.

On the other hand, examples of the anode active material in the present invention include a metal active material and a carbon active material. Examples of the metal active material include In, Al, Si, and Sn. On the other hand, examples of the carbon active material include mesocarbon microbeads (MCMB), high orientation property graphite (HOPG), hard carbon and soft carbon.

Examples of the shape of the active material include a particulate shape, and preferably a perfectly spherical shape or an elliptically spherical shape, above all. Also, in the case where the above-mentioned oxide active material is in a particulate shape, the average particle diameter thereof ($D_{50}$) is, for example, preferably within a range of 0.1 µm to 50 µm. Incidentally, the above-mentioned average particle diameter may be determined by a granulometer, for example. Also, the content of the active material in the electrode layer for a secondary battery is, for example, preferably within a range of 10% by mass to 99% by mass, and more preferably within a range of 20% by mass to 90% by mass.

The content of the sulfide solid electrolyte material in the electrode layer for a secondary battery is, for example, and preferably within a range of 1% by mass to 90% by mass, more preferably within a range of 10% by mass to 50% by mass. The reason therefor is that too small content of the sulfide solid electrolyte material brings a possibility of decreasing ion conductivity of the electrode layer for a secondary battery, whereas too large content of the sulfide solid electrolyte material brings a possibility of decreasing capacity.

The content of the branched polymer in the electrode layer for a secondary battery is, for example, preferably within a range of 0.01% by mass to 30% by mass, and more preferably within a range of 0.1% by mass to 10% by mass. The reason therefor is that too small content of the branched polymer brings a possibility of not allowing a desired flexibility, whereas too large content of the branched polymer brings a possibility of decreasing ion conductivity and electron conductivity.

The electrode layer for a secondary battery of the present invention comprises at least the above-mentioned active material, sulfide solid electrolyte material, and branched polymer. In addition, the electrode layer for a secondary battery of the present invention may contain a conductive material. The addition of the conductive material allows electron conductivity of the electrode layer for a secondary battery to be improved. Examples of the conductive material include acetylene black, Ketjen Black and carbon fiber. Also, the electrode layer for a secondary battery of the present invention preferably has a desired flexibility. The reason therefor is to be excellent in workability and moldability. Examples of the shape of the electrode layer for a secondary battery include a sheet shape and a pellet shape. The thickness of the electrode layer for a secondary battery varies with factors such as kinds of an intended all solid secondary battery and uses of the electrode layer for a secondary battery, and is preferably within a range of 1 μm to 200 μm, for example.

A method for producing the electrode layer for a secondary battery of the present invention is not particularly limited if the method is such as to allow the above-mentioned electrode layer for a secondary battery, but examples thereof include a method such that the active material, the sulfide solid electrolyte material and the branched polymer are mixed in a solvent to produce slurry, which is coated on a substrate by using coating methods such as a doctor blade method, a die coating method and a gravure coating method to thereafter dry the solvent. The above-mentioned solvent is not particularly limited if the solvent may disperse the active material, the sulfide solid electrolyte material and the branched polymer, but a nonpolar solvent is preferably used for the reason that the sulfide solid electrolyte material reacts with a polar solvent. Examples of the nonpolar solvent include saturated hydrocarbon solvent, aromatic hydrocarbon solvent, fluorine solvent and chlorine solvent.

C. All Solid Secondary Battery

Next, an all solid secondary battery of the present invention is described. The all solid secondary battery of the present invention comprises a cathode layer containing a cathode active material, an anode layer containing an anode active material, and a solid electrolyte layer formed between the above-mentioned cathode layer and the above-mentioned anode layer. In addition, the all solid secondary battery of the present invention may be roughly divided into two embodiments. The all solid secondary battery of the present invention is hereinafter described in each of the embodiments.

1. First Embodiment

A first embodiment of the all solid secondary battery of the present invention is an embodiment such that the above-mentioned solid electrolyte layer is the solid electrolyte layer described in the above-mentioned "A. Solid electrolyte layer". In this case, the use of the solid electrolyte layer described above allows the all solid secondary battery with low battery resistance.

Figure 4:
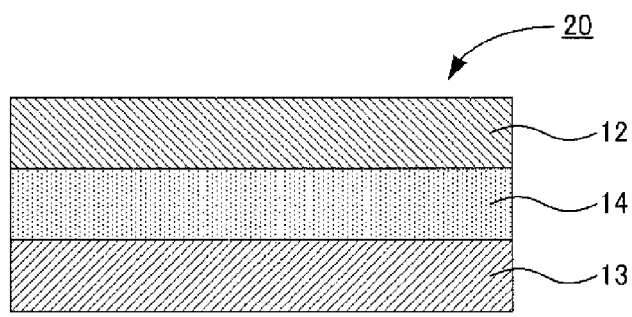
FIG. 4 is a schematic cross-sectional view showing an example of a power generating element of an all solid secondary battery of the present invention.

FIG. 4 is a schematic cross-sectional view showing an example of a power generating element of the all solid secondary battery of the present invention. A power generating element 20 of the all solid secondary battery shown in FIG. 4 comprises a cathode layer 12, an anode layer 13, and a solid electrolyte layer 14 formed between the cathode layer 12 and the anode layer 13. The solid electrolyte layer 14 in the embodiment is the solid electrolyte layer described above.

The all solid secondary battery of the embodiment comprises at least the power generating element comprising the cathode layer, the anode layer, and the solid electrolyte layer formed between the cathode layer and the anode layer, ordinarily further comprising a cathode current collector for collecting the cathode layer and an anode current collector for collecting the anode layer. Examples of a material for the cathode current collector include SUS, aluminum, nickel, iron, titanium and carbon, and preferably SUS among them. On the other hand, examples of a material for the anode current collector include SUS, copper, nickel and carbon, and preferably SUS among them. Also, the thickness and shape of the cathode current collector and the anode current collector are appropriately selected in accordance with uses of the all solid secondary battery and other factors. Also, a battery case of a general all solid secondary battery may be used for a battery case. Examples of the battery case include a battery case made of SUS.

Examples of kinds of the all solid secondary battery of the embodiment include an all solid lithium secondary battery, an all solid sodium secondary battery, an all solid magnesium secondary battery and an all solid calcium secondary battery, and above all, preferably an all solid lithium secondary battery. Examples of uses of the all solid secondary battery of the embodiment include a car-mounted battery by reason of being repeatedly charged and discharged. Examples of the shape of the all solid secondary battery of the present invention include a coin shape, a laminate shape, a cylindrical shape and a rectangular shape. Also, a producing method for the all solid secondary battery of the embodiment is not particularly limited if the method is such as to allow the above-mentioned all solid secondary battery, but the same method as a producing method for a general all solid secondary battery may be used.

2. Second Embodiment

A second embodiment of the all solid secondary battery of the present invention is an embodiment such that at least one of the above-mentioned cathode layer and the above-mentioned anode layer is the electrode layer for a secondary battery described in the above-mentioned "B. Electrode layer for secondary battery". In this case, the use of the electrode layer for a secondary battery described above allows the all solid secondary battery with low battery resistance. Also, the electrode layer for a secondary battery contains the active material, so as to inhibit a high resistive layer from being produced by a reaction between the active material and the sulfide solid electrolyte material, and allow the all solid secondary battery with low battery resistance.

The embodiment is characterized in that at least one of the cathode layer 12 and the anode layer 13 in FIG. 4 is the electrode layer for a secondary battery described above; and both the cathode layer 12 and the anode layer 13 are preferably the electrode layer for a secondary battery described above. The reason therefor is to allow battery resistance to be further inhibited from increasing. Also, in the embodiment, the solid electrolyte layer is preferably the solid electrolyte layer described in the above-mentioned "A. Solid electrolyte layer". The reason therefor is to allow battery resistance to be further inhibited from increasing. Incidentally, constitution and other items of the all solid secondary battery other than the power generating element are the same as the contents described in the above-mentioned first embodiment; therefore, the description herein is omitted.

Incidentally, the present invention is not limited to the above-mentioned embodiments. The above-mentioned embodiments are exemplification, and any is included in the technical scope of the present invention if it has substantially the same constitution as the technical idea described in the claim of the present invention and offers similar operation and effect thereto.

EXAMPLES

The present invention is described more specifically while showing examples hereinafter.

Example 1

(Synthesis of Sulfide Solid Electrolyte Material not Having Cross-Linking Sulfur Substantially)

Lithium sulfide ($Li_2S$) and phosphorus pentasulfide ($P_2S_5$) were used as a starting material. These powders were weighed so as to become a molar ratio of x=75 in a composition of $xLi_2S \cdot (100-x)P_2S_5$, and mixed by an agate mortar to obtain a raw material composition. Next, 1 g of the obtained raw material composition was projected into a 45-ml zirconia pot, and zirconia ball ($\phi$=10 mm, 10 pieces) was further projected thereinto to hermetically seal the pot completely. This pot was mounted on a planetary ball milling machine (P7™ manufactured by Fritsch Japan Co., Ltd.) to perform mechanical milling for 20 hours at the number of revolutions of 300 rpm and then obtain a sulfide solid electrolyte material ($75Li_2S \cdot 25P_2S_5$ glass). Incidentally, the relation of $Li_2S:P_2S_5$=75:25 (molar ratio) is a relation such as to allow the above-mentioned ortho-composition, and the obtained sulfide solid electrolyte material does not have cross-linking sulfur substantially.

(Production of Solid Electrolyte Sheet)

A solid electrolyte sheet was produced in inert gas. First, $75Li_2S \cdot 25P_2S_5$ glass (1000 mg) as the sulfide solid electrolyte material and branched hydrogenated butadiene rubber (manufactured by JSR Corporation, a hydrogenation rate of 94%, a number-average molecular weight of 500,000 to 600,000, a structure such that four straight-chain polymers extends from the central carbon atom (the carbon number of each main chain is at least 10 or more), 10 mg) as a branched polymer were prepared, and these materials were dispersed into heptane (660 mg) to obtain slurry. Next, this slurry was coated on an SUS foil with a texture amount of 16.1 mg/cm$^2$ by using a doctor blade to dry heptane as the solvent by heat-treating at a temperature of 120° C. for 60 minutes. Thus, a solid electrolyte sheet was obtained. In addition, a solid electrolyte sheet was obtained in the same manner as the above except for modifying the added amount of the branched polymer into 20 mg and 30 mg. Incidentally, the case where the added amount of the branched polymer was 10 mg, 20 mg and 30 mg was regarded as 1-mass % addition, 2-mass % addition and 3-mass % addition, respectively.

Comparative Example 1

A solid electrolyte sheet was obtained in the same manner as Example 1 except for replacing the branched polymer with unbranched hydrogenated butadiene rubber (manufactured by JSR Corporation, a hydrogenation rate of 94%, a number-average molecular weight of 200,000 to 300,000) as an unbranched polymer.

[Evaluations]

(Measurement of Li Ion Conductivity Maintenance Factor)

Li ion conductivity was measured by using the solid electrolyte sheets obtained in Example 1 and Comparative Example 1. First, the solid electrolyte sheet was cut into a battery cell size of 1 cm$^2$ in inert gas and pressed at 4.3 ton/cm$^2$ to thereby produce a battery cell. Next, Li ion conductivity of the battery cell was measured by alternating current impedance measurement. The maintenance factor of Li ion conductivity was calculated by dividing this Li ion conductivity by Li ion conductivity in the solid electrolyte sheet to which a binder was not added. The results of Example 1 and Comparative Example 1 are shown in Tables 1 and 2, respectively.

(Binding Capacity Measurement)

Figure 5:
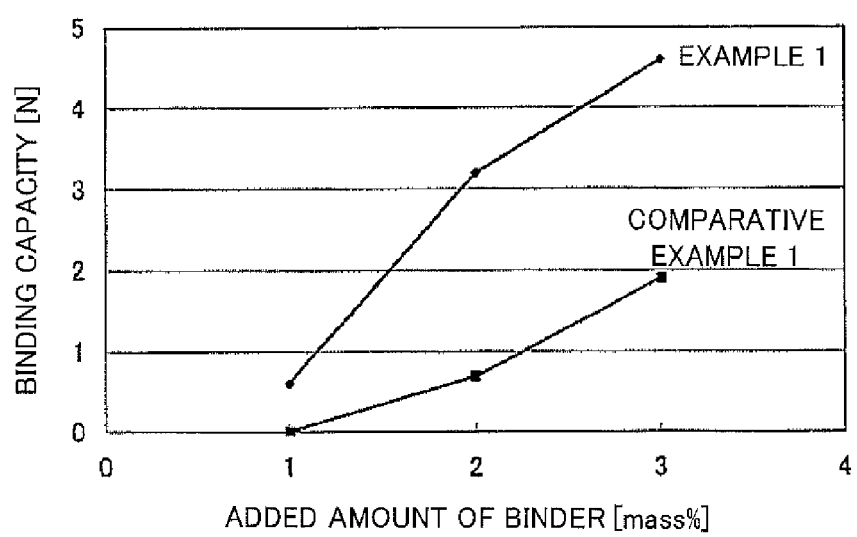
FIG. 5 is a graph showing relations between added amounts of binders and binding capacities in solid electrolyte sheets obtained in Example 1 and Comparative Example 1.

Binding capacity was measured by using the solid electrolyte sheets obtained in Example 1 and Comparative Example 1. First, the solid electrolyte sheet cut into $\phi$16 mm was stuck to a stand of a push-pull gauge with a double-sided adhesive tape. Next, a double-sided adhesive tape was stuck to a terminal of the push-pull gauge and pushed on the solid electrolyte sheet to thereafter measure tensile strength in lifting up the gauge. The results of Example 1 and Comparative Example 1 are shown in Tables 1 and 2, respectively. Also, a relation between an added amount of a binder and binding capacity is shown in FIG. 5.

(Flexibility Evaluations)

Flexibility was evaluated by using the solid electrolyte sheets obtained in Example 1 and Comparative Example 1. It was determined that the case where the solid electrolyte sheet was bound to a collector foil had flexibility for the reason that it was possible to bend the solid electrolyte sheet. The results of Example 1 and Comparative Example 1 are shown in Tables 1 and 2, respectively.

TABLE 1

| Added amount of binder [mass %] | 1 | 2 | 3 |
|---|---|---|---|
| Maintenance factor of Li ion conductivity [%] | 93 | 77 | 53 |
| Binding capacity [N] | 0.6 | 3.2 | 4.6 |
| Flexibility | Present | Present | Present |

TABLE 2

| Added amount of binder [mass %] | 1 | 2 | 3 |
|---|---|---|---|
| Maintenance factor of Li ion conductivity [%] | — | 70 | 46 |
| Binding capacity [N] | 0.0 | 0.7 | 1.9 |
| Flexibility | Absent | Present | Present |

As shown in Table 1, in Example 1, 1 mass % of an added amount of a binder allowed flexibility to the solid electrolyte sheet, so that it was confirmed that a solid electrolyte layer might be produced with a Li ion conductivity maintenance factor of 93%. On the other hand, as shown in Table 2, in Comparative Example 1, 2 mass % of an added amount of a binder allowed the same binding capacity as the solid electrolyte sheet with 1 mass % of an added amount of a binder in Example 1 and allowed flexibility to the solid electrolyte sheet, so that it was confirmed that a solid electrolyte layer might be produced with a Li ion conductivity maintenance factor of 70%. Thus, it was shown that the use of the branched polymer allowed flexibility by a small amount of addition and allowed high Li ion conductivity to be maintained. Also, as shown in FIG. 5, it was confirmed that a small amount of addition allowed high binding capacity in Example 1 as compared with Comparative Example 1.

REFERENCE SIGNS LIST

1 . . . sulfide solid electrolyte material
2 . . . branched polymer
3 . . . active material
10, 14 . . . solid electrolyte layer
11 . . . electrode layer for secondary battery
12 . . . cathode layer
13 . . . anode layer
20 . . . power generating element of all solid secondary battery

The invention claimed is:

1. A solid electrolyte layer comprising a sulfide solid electrolyte material not having cross-linking sulfur substantially and a branched polymer for binding the sulfide solid electrolyte material, wherein
the sulfide solid electrolyte material is an $Li_2S$—$P_2S_5$ material, and
a ratio of $Li_2S$ and $P_2S_5$ in the $Li_2S$—$P_2S_5$ material is within a range of $Li_2S:P_2S_5=72:28$ to $78:22$ in terms of mol.

2. The solid electrolyte layer according to claim 1, wherein the branched polymer is a hydrogenated polymer.

3. An electrode layer for a secondary battery comprising an active material, a sulfide solid electrolyte material not having cross-linking sulfur substantially, and a branched polymer for binding the active material and the sulfide solid electrolyte material, wherein
the sulfide solid electrolyte material is an $Li_2S$—$P_2S_5$ material, and
a ratio of $Li_2S$ and $P_2S_5$ in the $Li_2S$—$P_2S_5$ material is within a range of $Li_2S:P_2S_5=72:28$ to $78:22$ in terms of mol.

4. The electrode layer for a secondary battery according to claim 3, wherein the branched polymer is a hydrogenated polymer.

5. An all solid secondary battery comprising a cathode layer containing a cathode active material, an anode layer containing an anode active material, and a solid electrolyte layer formed between the cathode layer and the anode layer,
wherein the solid electrolyte layer is the solid electrolyte layer according to claim 1.

6. An all solid secondary battery comprising a cathode layer containing a cathode active material, an anode layer containing an anode active material, and a solid electrolyte layer formed between the cathode layer and the anode layer,
wherein at least one of the cathode layer and the anode layer is the electrode layer for a secondary battery according to claim 3.

* * * * *